Jan. 13, 1959 R. D. BARRETT 2,868,273
SWINGABLE AND RESILIENTLY MOUNTED TRACTOR SEAT
Filed Sept. 28, 1956 5 Sheets-Sheet 1
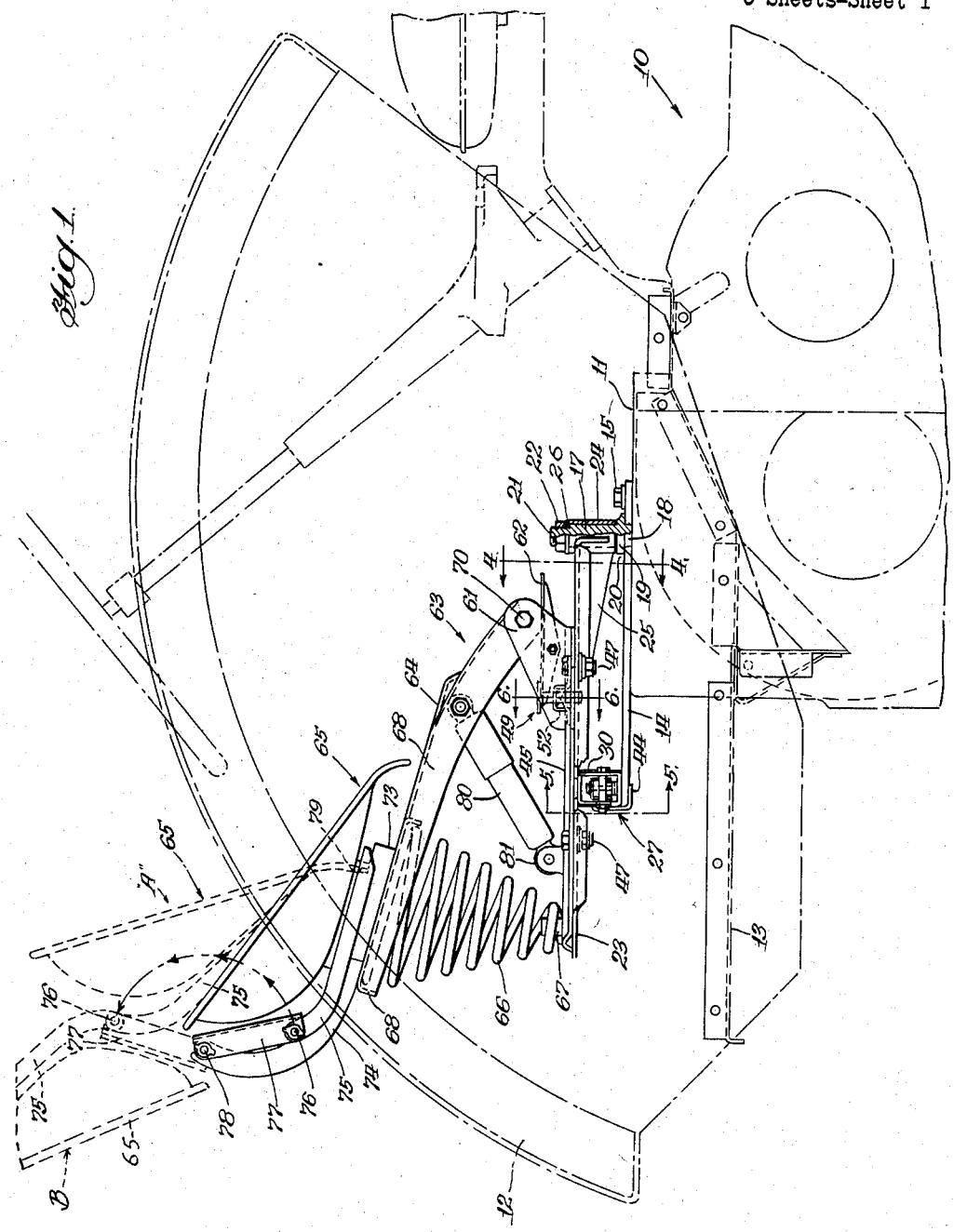
INVENTOR.
Robert D. Barrett
BY
Paul O. Pippel
Atty.

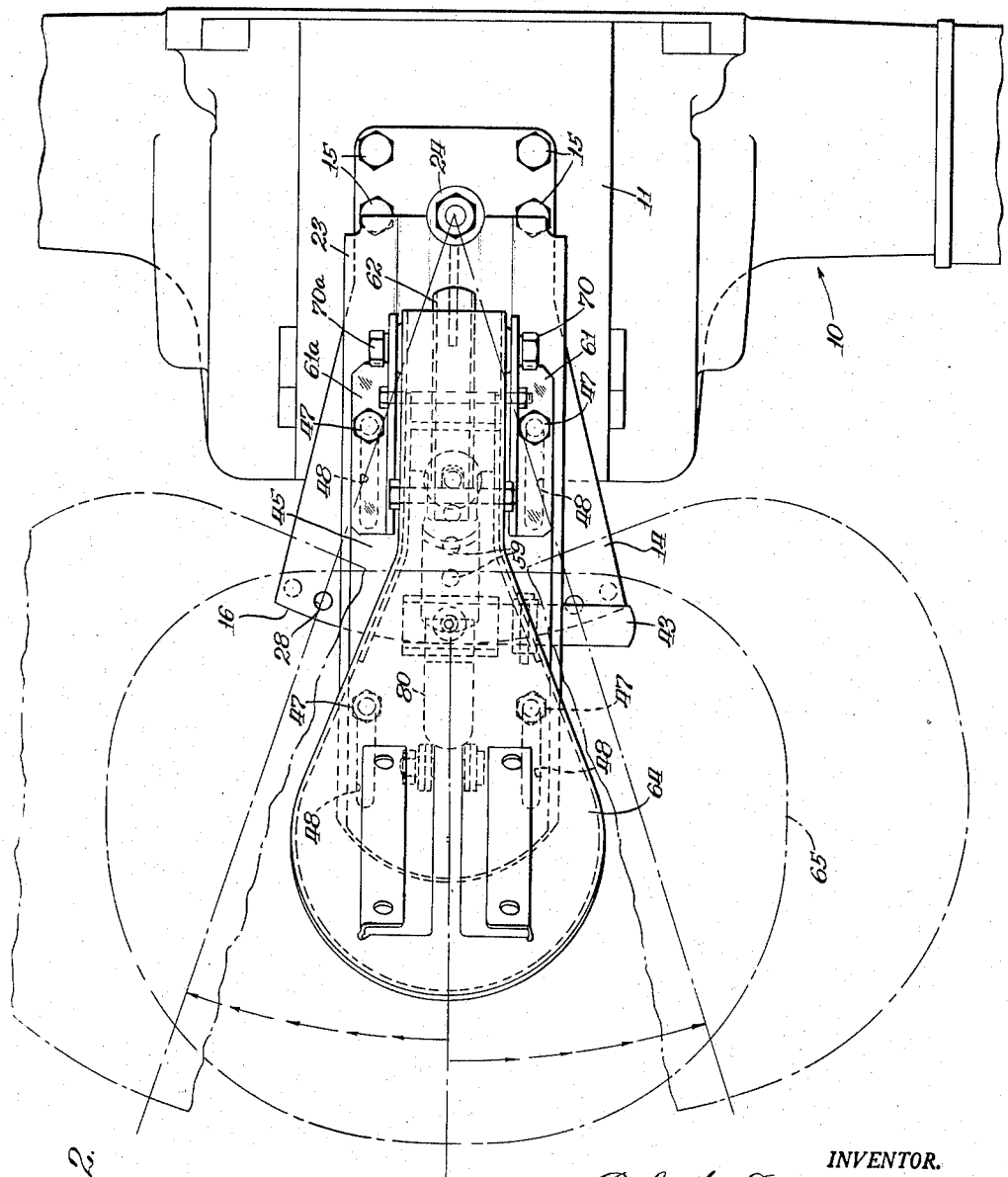

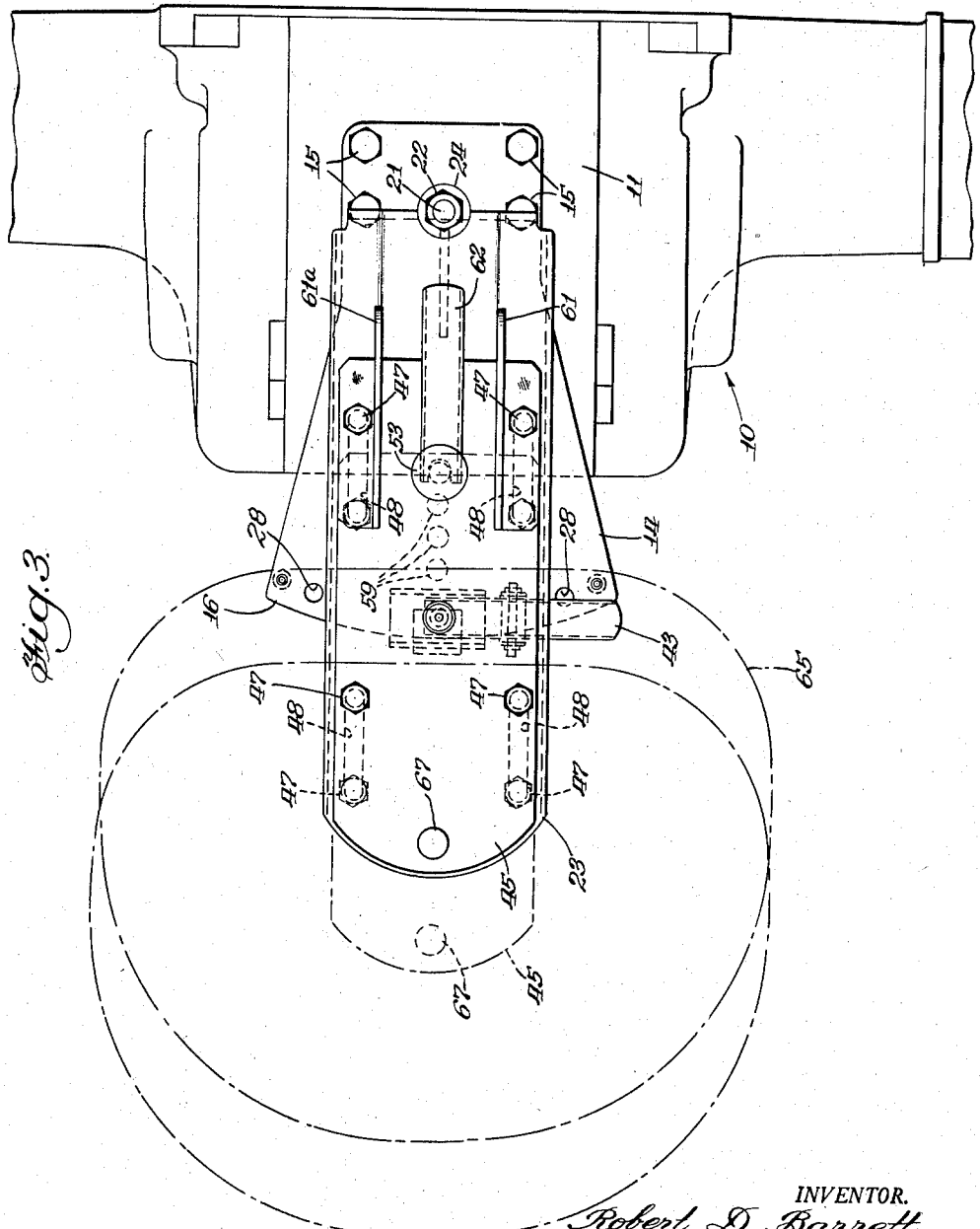

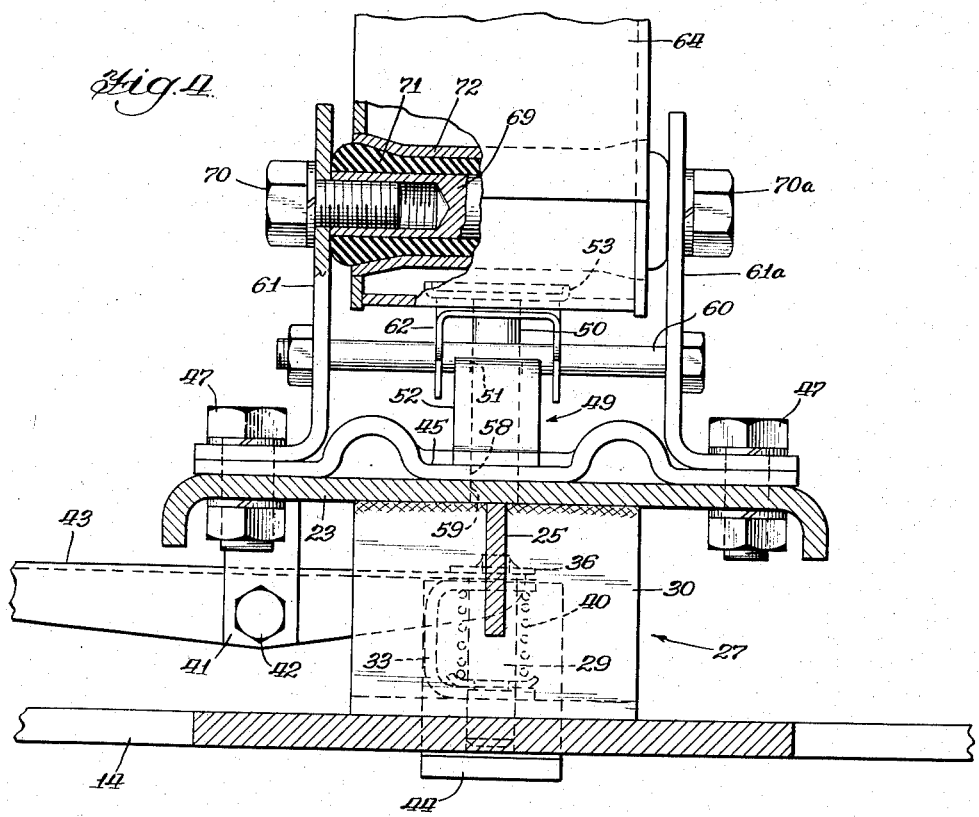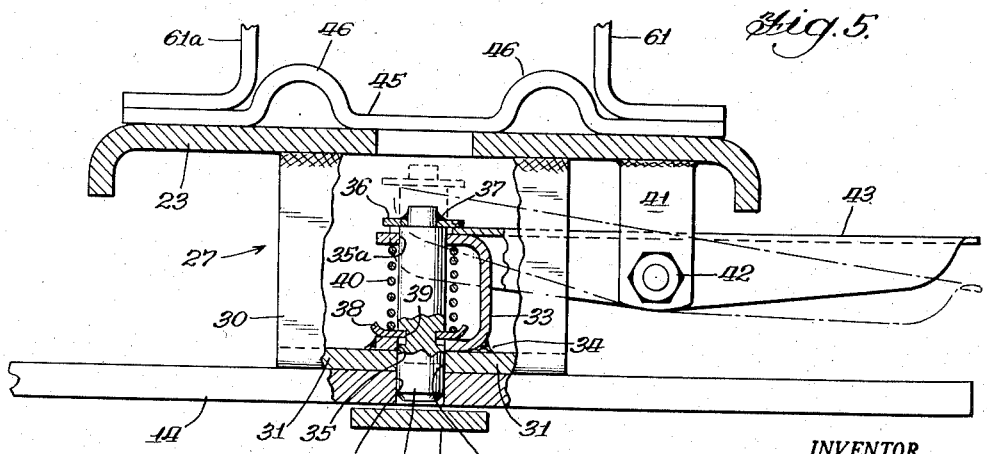

Jan. 13, 1959 R. D. BARRETT 2,868,273
SWINGABLE AND RESILIENTLY MOUNTED TRACTOR SEAT
Filed Sept. 28, 1956 5 Sheets-Sheet 5

INVENTOR.
Robert D. Barrett
BY
Paul O. Pippel
Atty.

United States Patent Office 2,868,273
Patented Jan. 13, 1959

2,868,273

SWINGABLE AND RESILIENTLY MOUNTED TRACTOR SEAT

Robert D. Barrett, Westchester, Ill., assignor to International Harvester Company, a corporation of New Jersey Application September 28, 1956, Serial No. 612,700

6 Claims. (Cl. 155—51)

This invention relates generally to tractor seats but is more specifically directed to the provision of a resiliently mounted and longitudinally adjustable seat which is also laterally or transversely swingable.

The use of resiliently mounted seats in tractors, as well as in many other types of vehicles, is, of course, well known in the industry since many varieties of such seats have heretofore been utilized in all classes of vehicles. Although many forms of adjustable and resiliently mounted seats have been developed for tractors there is a noticeable absence, in such prior structures, of any tilt-back and longitudinally adjustable seat which, additionally, is mounted for swinging movement about a vertical axis. Such an arrangement is particularly desirable because it permits the seat to be swung entirely out of the way of the operator when the operator drives the tractor from a standing position. Although some of the prior art structures did provide means for tilting the seat pan backwardly out of position to permit standing by the operator, none of these prior structures provided any means for moving the seat support mechanism completely out of the operator's way; hence the operator is usually required to straddle these supports in order to operate the tractor in a standing position. This, of course, is undesirable because it limits the operator's movements, and, furthermore, it forces him to work in an awkward and excessively fatiguing position.

A primary feature of the present invention, thus is to provide means for overcoming such shortcomings and handicaps of the prior art seat structures as have heretofore been proposed.

The principal object of the present invention, therefore, is to provide a resiliently mounted tractor seat that, additionally, is capable of swinging movement in a horizontal plane about a vertical axis.

Another object is to provide a resiliently mounted tractor seat that is readily adjustable to provide the fore and aft movement that is desirable to accommodate operators of different physical statures.

A further object is to provide an improved tractor seat mounting mechanism which permits rotation of the seat in a plane parallel to the operator's platform of the tractor chassis.

A still further object is to provide a resiliently mounted tractor seat that may be positively locked in a plurality of arcuately displaced or traversed positions.

A yet still further object is to provide an improved tractor seat mounting mechanism which permits rotation of a resiliently mounted tilt-back seat assembly about a vertical axis, and further provides manually operating means for locking and unlocking the seat in any one of a plurality of such rotated positions.

Another important object is to provide independent and readily available manually operable means for controlling the longitudinal adjustment and the lateral displacement of a tractor seat, in a generally horizontal plane, and wherein said seat may be locked in each of its adjusted positions.

Further objects and advantages of the present invention will be apparent from the full description, reference being had to the accompanying drawings wherein a preferred form of the invention is clearly shown:

Figure 1 is a fragmentary side elevational view of a tractor equipped with the present invention, but shown with the wheel nearest the viewer removed for purposes of simplification, and to expose in side elevational view the proposed operator's seat in a normal unoccupied position as represented by the solid lines, and in optional positions as illustrated by the dotted and dot-dash lines.

Figure 2 is a fragmentary top plan view of a tractor equipped with the proposed seat construction, the rotative positions of the seat pan being shown in fragmentary and broken lines.

Figure 3 is a top plan view of the proposed seat assembly, but illustrated with the seat pan shown in broken lines and with the supporting suspension beam therefor omitted to better display the swingable supporting members, the retracted position being shown in solid lines and the longitudinally extended position thereof being shown in a broken line.

Figure 4 is a vertical sectional view, taken on line 4—4 of Figure 1, of the proposed seat assembly with portions of the seat suspension unit broken away or omitted to show the details of the supporting assembly thereof.

Figure 5 is a fragmentary vertical sectional view, taken along the line 5—5 of Figure 1, and shown with portions thereof broken away.

Figure 6:
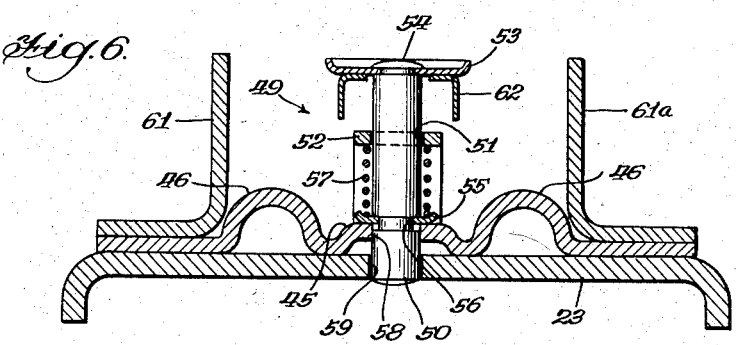
Figure 6 is a fragmentary vertical sectional view, taken on line 6—6 of Figure 1.

In depicting a preferred application of the present invention it will be seen that it has been illustrated as installed on a generally conventional wheel-type tractor vehicle, which, in the attached drawings, is shown only in fragmentary form as represented generally by the reference numeral 10. Such tractor is usually fashioned with a rugged frame or housing-like chassis, shown in part at 11, which houses and journals many of the components thereof, but which components, for purposes of clarity and simplification, have not been shown on the drawings. A pair of rear wheel guards or fenders 12, only one of which is shown, are suitably supported in conventional fashion on said frame while a rearwardly extending platform, such as 13, may be suitably attached and supported between said guards.

A base-plate member, such as is shown at 14, serves as a platform or floor-like foundation support for the swingable seat assembly of the present invention. Said base-plate is affixed at one end thereof to the upper or top surface of the tractor chassis 11 and any suitable means, such as the four cap screws 15, may be employed to fixedly position said plate in position thereon. The base-plate 14, as best seen in Figures 2 and 3, preferably, is flat and of segmental shape with the free end thereof arcuately curved as shown at 16. Inwardly spaced on said plate, a short distance from the end thereof through which said cap screws are fastened, there is disposed a pedestal-like vertically positioned post support member 17. While said post or pedestal may be securely affixed to said base-plate by any suitable or well known means the arrangement illustrated includes a stud-like extension 18 on one end thereof that is fitted into an opening in the plate member 14, while a collar-like shoulder forming portion 19 on the pedestal also serves as an abutting fixture whereby the pedestal may be fixedly secured to the base-plate by suitable means, such as the welds shown at 20. The opposite or free end 21 of said pedestal is slightly reduced in diameter and provided with screw threads that receive a locking nut such as 22.

The pedestal 17 is adapted to pivotally mount a seat supporting member, such as the channel-like member indicated generally by the numeral 23. At one end and midway between the side flanges of said channel member there is fixedly secured a journalling boss 24 having an opening therethrough which is dimensioned to pivotally receive the pedestal post 17. A gusset-like reinforcing web, such as 25, may extend between said boss and said channel member to provide additional rigidity to said channel member as it rotates around said pedestal. A bearing or thrust washer, such as 26, may be provided between the top of said journal and the lock nut 22 to facilitate the rotation of said channel member without disturbing the setting of said lock nut.

The support channel 23 has a rotation or traverse locking device affixed thereto, and indicated generally at 27, that is adapted to permit rotation of said channel member about the pedestal 17 and additionally to lock said member to the base plate 14 in any one of several rotationally displaced or traversed positions. The curved end 16 of said base-plate is fashioned to describe an arc centered about the vertical axis of the pedestal 17, while a plurality of openings 28, spaced along said base-plate in an arc whose center is also that of the pedestal's axis, are disposed to receive a releasable locking pin 29 that is carried by the locking device 27. A U-shaped bracket 30 is suitably affixed to the underneath side of the channel support member 23 and disposed so that the open mouth of said bracket faces said channel support, while the connecting arm 31 thereof has an opening 32 therein that is dimensioned to slideably receive the pin 29. An additional U-shaped bracket 33 is turned on its side and fixedly secured inside the bracket 30, as by the welds 34, to the arm 31 thereof. The parallel arms of the bracket 33 are provided with aligned openings 35—35a which are disposed to register with the opening 32 in the bracket 30. A flange-like cap member 36 is affixed, by suitable conventional means such as the welds 37, to the free end of the pin 29, while a spring retainer cup 38, disposed in an annular groove 39 around said pin, abuttingly receives and supports one end of a coil spring 40 the opposite end of which abuts one of the arms of the U-bracket 33. A further U-shaped bracket 41 is suitably secured so as to depend from the underneath surface of channel 23 and disposed so that the mouth or open end of the U opens outwardly and downwardly. Pivotally mounted, by suitable means such as the bolt means 42, within the bracket 41 is a pin release lever 43, one end of which is notched and adapted to straddle the pin 29 and to fit underneath the pin cap 36 so as to lift and release said pin from any one of the holes 28, in the base-plate 14, when a downward force is applied to the opposite end of said lever.

An L-shaped angle member 44 has one arm thereof suitably secured to the bracket 30 while its other arm is disposed to overlap in slidable locking relation the curved edge portion 16 of the said base-plate. The locking device 27 thus serves not only to lock the channel support member 23 in a plurality of rotationally displaced or traversed positions but also to effectively limit vertical displacement of said support member with respect to said base-plate and thereby further stabilize the assembly, while connecting arm 31, of bracket 30, also provides a sliding bearing surface when swinging the seat to various positions.

The channel support member 23 has a mounting plate 45 slidably mounted thereon. Said mounting plate, preferably, is fashioned with a pair of spaced longitudinally extending ribs 46 which function to provide reinforcement for said member. The plate 45 is positioned over the channel support member 23 and is slidably fastened thereto by the four shoulder bolt and nut means, such as shown at 47, wherein the bolt shanks pass through openings in said plate and are received in aligned slotted openings 48 in said channel support member. The plate 45 may be slidably moved longitudinally along the channel member 23 to any one of a plurality of different positions, and one such position is shown by the broken line in Figure 3.

In order to lock the mounting plate 45 against longitudinal movement relative to the channel support member 23 there is provided a pin-type locator or locking device, indicated generally at 49, which is somewhat similar in arrangement to that of the previously described locking pin device 27. A pin 50 is vertically disposed and slidably mounted through an opening 51 in a generally U-shaped bracket 52 that is fixedly mounted by well known means on the mounting plate 45. The pin 50 has a flange-like cap member 53 affixed, by suitable well known means such, for instance, as the screw bolt 54, to the free end thereof, while a spring retainer cup 55, disposed in an annular groove 56 around said pin, abuttingly receives and supports one end of a coil spring 57 the opposite end of which spring abuts the cross-arm of the bracket 52. An opening 58, in the plate 45 permits the pin 50 to project through said plate and selectively into locking relation with any one of a plurality of registering openings 59, and which latter openings are longitudinally spaced in the channel support member 23. Pivotally mounted, by suitable means such as the bolt and nut 60, between the walls of the complementary brackets 61—61a is a pin release lever 62, one end of which is notched and disposed to straddle the pin 50 and to fit underneath the pin cap 53 thereon so as to lift and release said pin from any one of the holes 59 in the channel support member 23 when a downward force is applied to the opposite end of said release lever. When said pin is thus released the mounting plate member 45 may be slidably moved longitudinally, to a position such as is indicated by the broken line in Figure 3, and then firmly locked in such position by insertion of the pin in another one of the registering openings 59 in the channel support member 23.

The complementary disposed brackets 61—61a may be fixedly mounted on the mounting plate 45 by the forwardly disposed pair of bolt and nut means 47, as illustrated, or by any other suitable conventional means, if so desired. Said brackets are adapted to carry and support one end of the seat suspension assembly which is indicated generally by the reference numeral 63. Since the seat suspension assembly illustrated is generally conventional, it will be understood that the invention is not limited to this particular structure, and hence variations of such suspension may be substituted without deviating from the inventive concepts of the present combination adjustable and swingable seat structure.

The suspension, as illustrated, includes a generally channel-shaped seat supporting beam 64, one end of which is pivotally attached to the brackets 61—61a while the opposite end thereof is adapted to supportably carry the seat pan 65 and its associated mounting components. An inverted conical spring 66, disposed beneath the rear upper portion of the seat supporting beam 64, reacts between this beam and the upper surface of the mounting plate member 45 to resist downward movement of this rearward portion of the seat beam when the tractor seat is occupied. An anchoring or locator stud, such as shown at 67, may be securedly affixed to the mounting plate 45 to suitably retain the lower end of said spring in position, while the overturned side and edge flange portion 68, of the channel beam 64, may serve to retain the upper end of said spring suitably positioned.

The beam 64 may be pivotally supported between the brackets 61—61a by torsional mounting means which include a central stud or shaft 69 which is internally threaded at each end thereof to receive the bolts 70—70a that are mounted, in turn, in the respective brackets 61—61a. A sleeve of suitable well known resilient material, such as the rubber indicated at 71, surrounds the stud 69 and is firmly positioned within a cylindrical extension 72 and said extension is fixedly secured to said beam and extends between the side flanges thereof. As is well understood with torsional mountings of this character the torsional resistance of the mounting may be increased or decreased by suitable adjustment of the bolts 70 and 70a.

Figure 7:
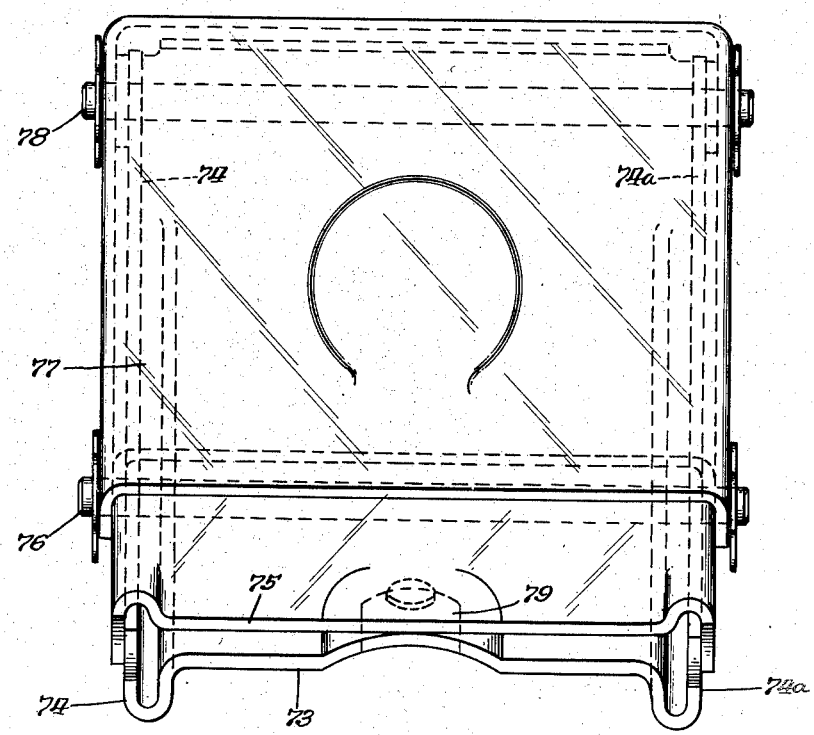
Figure 7 is a front end elevational view of the tilt-back seat bracket assembly.

Rigidly mounted upon the upper rear portion of the seat supporting beam 64 is a curved seat supporting pad 73, fashioned in the form of a sheet metal channel having opposite upwardly turned flanges 74—74a which are visible in Figure 7. A seat pan mounting member 75, also of channel section, and visible in Figure 7, is adapted to rest upon the pad 73 and has its rear end connected by a pivot pin 76 with one end of a broad shackle-like link 77, and also of channel section. The upper end of this link is pivotally connected by a long pin 78 with the upper rear end of the pad 73. Normally, the seat pan 65, which is rigidly mounted upon the pan mounting member 75, will occupy the position shown, in solid lines in Figure 1, with respect to the beam 64 and pad 73, and, when the seat pan is in this position, the operator is free to use it as a seat.

Standing by the operator may be facilitated by shifting the seat pan upwardly and rearwardly into the positions "A" and "B" shown respectively by the dotted lines and by the dot-dash lines in Figure 1. As the pan is rearwardly moved, simultaneously, the connecting link 77 swings upwardly to the dotted line or "A" position shown, and this link can swing no further counterclockwise around the long pivot pin 78 because the end edge thereof will abut the upwardly extending rear side of the pad 73. While in this rearwardly shifted and downwardly forwardly inclined position (position "A," Figure 1), the front end of the seat pan 65 hooks behind an upwardly projecting stud 79, fashioned in the form of a tang turned upwardly from the seat supporting pad 73, which stud prevents the seat pan from accidentally sliding forwardly and downwardly into the occupant-receiving position. While the seat pan is shifted upwardly, into the "A" position of Figure 1, the tractor operator, while standing astride the beam 64, can lean backwardly against the seat, which then serves as a stabilizer for the operator while said operator stands.

In the event the operator should choose not to use the seat as a prop against which to lean backwardly, the seat pan 65 may be pivoted from the "A" position, about the pivot 76, to the "B" position. Since the seat pan will then be above the pivot 76 and since the link 77 is also swung upwardly, this will place the seat pan 65 in the inverted position shown by the dot-dash line of position "B," Figure 1. This latter position of the seat will also protect the seat pad from weathering while the tractor is standing outdoors.

The spring 66 which supports the seat pan, preferably, is in the form of a variable rate coil spring and is positioned directly beneath the seat with the convolution of greatest diameter supported under the beam 64 and beneath the seat pan. In accordance with conventional practises, successive convolutions of the spring decrease in diameter from the lowermost convolution to the uppermost convolution. The arrangement is such that when the coil spring is compressed, the convolutions thereof nest within one another and thereby enable obtaining maximum spring deflection in the relatively limited space provided between the seat pan and the mounting plate, also, the variable rate spring provides for increasing the resistance to deflection of the seat as the load on the latter increases. This is particularly advantageous in that it insures effective suspension of the seat throughout a wide range of loads.

If desired, a conventional shock absorber 80 may be provided to aid or supplement the spring 66 in absorbing shock over bumps and the like. One end of said shock absorber may be pivotally attached to a bracket 81 fixedly secured to the mounting plate 45, while the opposite end of the shock absorber may be pivotally attached, by any suitable and well known means, to the beam support member 64. In this way the shock absorber, and inverted coil spring 66 form a unitary structure with the seat suspension assembly and thus may be moved therewith either longitudinally or during traversing to the right or left thereof.

From the above it will be readily appreciated that the present invention provides a highly improved tractor seat structure. It provides a seat that may readily be adjusted longitudinally to accommodate operators of various heights, and it may also be rotatably pivoted to the right or to the left so as to be out of the way of the operator when the operator drives the tractor in a standing position. Furthermore, of course, the seat may be tilted to provide a rest for the operator when driving in a standing position. The structure additionally, is simple, flexible, easy to incorporate into a conventional tractor, positive in operation, and, of course, very rugged in construction.

While only one form of the invention has been shown, it will be obvious to those skilled in the art that it is not so limited, but is susceptible of various modifications without departing from the spirit thereof, and it is desired, therefore, that only such limitations shall be placed thereon as are specifically set forth in the appended claims.

What is claimed is:

1. A vehicle seat construction including in combination: a longitudinally extending base-plate member adapted for affixment proximate one end thereof to a vehicle, the opposite end thereof being arcuately shaped; a vertically disposed pedestal fixedly secured to said base-plate and extending upwardly therefrom; a support member rotatably mounted on said pedestal and rotatable in a plane parallel to said base-plate; interconnecting means depending from said support and overlapping the arcuately-shaped end of said base-plate member, and including releasable means interlocking said support with said base-plate member to prevent relative rotative movement therebetween; platform means slidably mounted on said support member and being movable longitudinally relative to said support member; means releasably interlocking said platform means with said support member to prevent relative longitudinal movement between said platform means and said support member; a seat assembly pivotally secured to said platform means and mounted for movement in a vertical plane; and resilient means extending between said platform means and said seat assembly for supporting said latter assembly.

2. A vehicle seat construction including in combination: a horizontally extending base-plate member adapted for affixment proximate an end thereof to a vehicle, the opposite end of said base-plate being arcuately-shaped; a vertically disposed pedestal fixedly secured to and extending from the upper surface of said base-plate; a horizontally extending support rotatably mounted at one end of said support on said pedestal, and being rotatable in a generally horizontal plane; clamping means secured to said support and overlapping the arcuately-shaped end of said base-plate to restrict relative vertical displacement therebetween; said clamping means being secured to said support intermediate the ends thereof; manually operable releasable means interlocking said support with said base-plate to restrict relative rotative movement therebetween; platform means slidably mounted on said support member and being movable longitudinally relative to said support; means releasably interlocking said platform means with said support and operative to lock said platform means against longitudinal movement relative to said support; a seat assembly pivotally secured to said platform means and mounted for movement in a vertical plane; and resilient means interconnecting said platform means and said seat assembly for supporting said latter assembly.

3. A vehicle seat construction including in combination: a horizontally extending base-plate member adapted for affixment proximate one end of said plate to a vehicle, and having the opposite end of said plate arcuately-shaped; a vertically disposed pedestal fixedly secured to said base-plate and extending upwardly therefrom; a support member rotatably mounted proximate one end of said support on said pedestal and rotatable thereabout in a plane generally parallel to said base-plate; said support being rotatable in an arc corresponding with the curvature of said arcuately-shaped end of said base-plate; clamping means secured intermediate the ends of said support and disposed to overlap the arcuately-shaped end of said base-plate to restrict relative vertical displacement therebetween; releasable pin means interlocking said support with said base-plate to restrict relative rotative movement therebetween; platform means slidably mounted on said support and being movable longitudinally relative to said support; releasable pin means interlocking said platform means with said support and operative to lock said platform means against longitudinal movement relative to said support; a seat assembly pivotally secured to said platform means and mounted for movement in a vertical plane; and resilient means interconnecting said platform means and said seat assembly to aid in the support of said latter assembly.

4. A vehicle seat construction including in combination: a horizontally extending base-plate member adapted for affixment proximate one end of said plate to a vehicle; a vertically disposed pedestal post secured to said base-plate and extending upwardly therefrom; the end of said base-plate opposite that adapted for affixment to a vehicle being fashioned to transcribe an arc centered about the vertical axis of said pedestal post; a support member rotatably mounted proximate one end of said support on said pedestal post and being rotatable about the vertical axis thereof in a plane substantially parallel to said base-plate member; interconnecting means secured to said support member intermediate the ends thereof and disposed to closely overlap the arcuately fashioned end of said base-plate member to restrict relative vertical displacement therebetween; manually operable pin means carried by said interconnecting means and operative for locking said support member with said base-plate member to prevent relative rotative movement between said plate and support members; platform means slidably mounted on said support member and being mounted for movement longitudinally relative to said support member; manually operable locator pin means for locking said platform means against longitudinal movement relative to said support member; said platform means including spaced apart brackets disposed proximate the end of said support member that is mounted on said pedestal post; a seat assembly pivotally mounted between said brackets of said platform means and being rotatable in a vertical plane; said seat assembly including a seat pan tiltable in a vertical plane away from said pedestal post; and resilient means interconnecting said platform means and said seat assembly to aid in the support of said latter assembly.

5. A vehicle seat construction including in combination: a horizontally disposed base-plate member adapted for affixment proximate one end of said plate to a vehicle, and having the opposite end of said plate arcuately shaped; a vertically disposed pedestal secured to said base-plate and extending upwardly therefrom; a longitudinally extending support member being channel-shaped in section and rotatably mounted on said pedestal with the opening of said channel facing said base-plate; said channel-shaped support member being rotatable in a plane parallel to said base-plate, and in an arc corresponding with the curvature of said arcuately-shaped end of said plate; said channel-shaped support member being mounted on said pedestal proximate one end of said support member; fastening means secured intermediate the ends of said channel-shaped support member and disposed to overlap the arcuately-shaped end of said base-plate to limit relative vertical displacement between said member and said plate; releasable pin means carried by said fastening means and operative for interlocking said channel-shaped support member with said base-plate to restrict relative rotative movement between said plate and support members; seat suspension means slidably fastened to said channel-shaped support member and disposed for longitudinal movement relative to said support member; releasable pin means interlocking said suspension means with said support member and operative to lock said suspension means against longitudinal movement relative to said support member; a seat assembly pivotally secured to said suspension means and mounted for up and down movement; and resilient means interconnecting said suspension means and said seat assembly to aid in the support of said seat assembly.

6. A vehicle seat construction including in combination: a horizontally extending base-plate member adapted for affixment proximate one end of said plate to a vehicle, and having the opposite end of said plate arcuately-shaped; a vertically disposed pedestal secured to said base-plate and extending upwardly therefrom; a longitudinally extending support member being channel-shaped in section and fashioned with a plurality of longitudinally extending slotted-openings therein; said support member being rotatably mounted on said pedestal with the opening of said channel facing said base-plate, and being rotatable in a plane generally parallel to said base-plate and in an arc concentric with the curved edge portion of said arcuately-shaped end of said plate; said support member being mounted on said pedestal proximate one end of said support member; fastening means secured intermediate the ends of said support member and disposed to overlap in a straddling relationship upper and lower surfaces of the arcuately-shaped end of said base-plate to limit relative vertical displacement between said member and said plate; releasable pin means carried by said fastening means for interlocking said support member with said base-plate in order to restrict relative rotative movement therebetween; seat suspension means including a longitudinally extending platform and spaced brackets secured to said platform, and having said latter means disposed above said support member and longitudinally slidable therealong; said platform being fashioned with longitudinally extending reinforcing ribs therein and having a plurality of openings disposed to register with the slotted openings of said support member; attaching means cooperating with the respective registering openings in said platform and said support member for slidably attaching the said platform to said support member; releasable pin means carried by said platform for locking said platform against longitudinal movement relative to said support member; a seat assembly pivotally disposed between said brackets and mounted for up and down movement; said seat assembly including a seat pan tiltable in a vertical plane and away from said pedestal; and resilient means interconnecting said platform and said seat assembly to aid in the support of said latter assembly.

References Cited in the file of this patent
UNITED STATES PATENTS

| 963,595 | Lerro | July 5, 1910 |
| 1,799,870 | Seaman | Apr. 7, 1931 |
| 1,895,803 | Kohler | Jan. 31, 1933 |
| 2,533,573 | Gabel | Dec. 12, 1950 |
| 2,605,819 | Tourneaw | Aug. 5, 1952 |
| 2,721,604 | Salvadore et al. | Oct. 25, 1955 |